United States Patent
Adams, Jr. et al.

(10) Patent No.: US 6,927,804 B2
(45) Date of Patent: Aug. 9, 2005

(54) REDUCING COLOR ALIASING ARTIFACTS FROM COLOR DIGITAL IMAGES

(75) Inventors: James E. Adams, Jr., Rochester, NY (US); John F. Hamilton, Jr., Rochester, NY (US); Craig M. Smith, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 522 days.

(21) Appl. No.: 10/237,947

(22) Filed: Sep. 9, 2002

(65) Prior Publication Data

US 2004/0046894 A1 Mar. 11, 2004

(51) Int. Cl.[7] ............................................... H04N 5/21
(52) U.S. Cl. ........................ 348/624; 348/242; 345/611
(58) Field of Search ................................ 348/624, 606, 348/630, 222.1, 242, 253; 345/611–616; 382/165, 167, 269, 275; 358/518

(56) References Cited

U.S. PATENT DOCUMENTS 6,326,964 B1 * 12/2001 Snyder et al. ............... 345/419

2004/0070677 A1 * 4/2004 Adams et al. ............ 348/222.1

FOREIGN PATENT DOCUMENTS

EP     1 202 220 A2     5/2002

* cited by examiner

Primary Examiner—Victor R. Kostak
(74) Attorney, Agent, or Firm—Raymond L. Owens

(57) ABSTRACT

A method of reducing color aliasing artifacts from a color digital image having color pixels includes providing luminance and chrominance signals from the color digital image; using such luminance and chrominance signals to separate the image into textured and nontextured regions having boundaries; downsampling the chrominance signals and texture region mapping; producing cleaned chrominance signals in the textured regions in response to the boundaries of the textured region and chrominance signals; producing cleaned chrominance signals in the nontextured regions in response to the chrominance signals; upsampling the noise-cleaned chrominance signals; and using the luminance and upsampled noise-cleaned chrominance signals to provide a color digital image having reduced color aliasing artifacts.

7 Claims, 6 Drawing Sheets

REDUCING COLOR ALIASING ARTIFACTS FROM COLOR DIGITAL IMAGES

CROSS REFERENCE TO RELATED APPLICATION

Reference is made to commonly-assigned U.S. patent application Ser. No. 09/688,894 filed Oct. 16, 2000, entitled "Removing Color Artifacts From Color Digital Images" by Adams et al, the disclosure of which is incorporated herein.

FIELD OF THE INVENTION

The present invention relates to reducing aliasing artifacts in colored digital images.

BACKGROUND OF THE INVENTION

One type of noise found in color digital camera images appears as low frequency, highly colored patterns in regions of high spatial frequency, for example, tweed patterns in clothing. These patterns, called color moiré patterns or, simply, color moiré, produce large, slowly varying colored wavy patterns in an otherwise spatially busy region. Color moiré patterns are also referred to as chrominance aliasing patterns, or simply, chrominance aliasing.

There are numerous ways in the prior art for reducing color moiré patterns in digital images. Among these are numerous patents that describe color moiré pattern reduction methods using optical blur filters in digital cameras to avoid aliasing induced color moiré in the first place. However, these blur filters also blur genuine spatial detail in the image that may not be recoverable by subsequent image processing methods.

Some approaches deal specifically with digital image processing methods for reducing or removing chrominance noise artifacts. One class of digital camera patents discloses improvements to the color filter array (CFA) interpolation operation to reduce or eliminate high frequency chrominance noise artifacts. Another class of patents teach using different pixel shapes (that is, rectangles instead of squares) with accompanying CFA interpolation operations to reduce or eliminate chrominance noise artifacts. However, these techniques address only high frequency chrominance noise, and are generally ineffective against low frequency color moiré.

There is the well known technique in the open literature of taking a digital image with chrominance noise artifacts, converting the image to a luminance-chrominance space, such as CIELAB (CIE International Standard), blurring the chrominance channels and then converting the image back to the original color space. This operation is a standard technique used to combat chrominance noise. One liability with this approach is that there is no discrimination during the blurring step between chrominance noise artifacts and genuine chrominance scene detail. Consequently, sharp colored edges in the image begin to bleed color as the blurring becomes more aggressive. Usually, the color bleed has become unacceptable before most of the low frequency color moiré is removed from the image. Also, if any subsequent image processing is performed on the image, there is the possibility of amplifying the visibility of the color bleeding. A second liability of this approach is that a small, fixed blur kernel is almost required to try to contain the problem of color bleeding. However, to address low frequency color moiré, large blur kernels would be needed to achieve the desired noise cleaning.

Adams, et al, (EP 1202220A2) discloses a method of color artifact reduction that uses adaptive, edge-responsive blur kernels to reduce low frequency color moiré while minimizing color bleeding. While this method addresses most of the concerns previously cited, it is computationally intensive and requires more computational resources than are currently available in most commercial digital cameras today.

SUMMARY OF THE INVENTION

It is an object of the present invention to provide an effective method for minimizing aliasing artifacts in color digital images.

It is another object to reduce color aliasing artifacts in color digital images that is effective on low frequency color moiré patterns while avoiding color bleeding and having sufficient computational simplicity to be implemented in limited computing environments.

This object is achieved in a method of reducing color aliasing artifacts from a color digital image having color pixels comprising the steps of:

(a) providing luminance and chrominance signals from the color digital image;

(b) using such luminance and chrominance signals to separate the image into textured and nontextured regions having boundaries;

(c) downsampling the chrominance signals and texture region mapping;

(d) producing cleaned chrominance signals in the textured regions in response to the boundaries of the textured region and chrominance signals;

(e) producing cleaned chrominance signals in the nontextured regions in response to the chrominance signals;

(f) upsampling the noise-cleaned chrominance signals; and (g) using the luminance and upsampled noise-cleaned chrominance signals to provide a color digital image having reduced color aliasing artifacts.

It is an advantage of the present invention that luminance and chrominance signals are used which not only reduce aliasing artifacts but also produce noise-cleaned chrominance signals.

Other advantages include:

Computation time is significantly reduced due to the reduced complexity of the computational method.

Highly aggressive noise cleaning with large effective neighborhoods can be performed without requiring large portions of the image to be resident in computer memory.

Edge detail in the image is protected and preserved during processing.

The invention is not sensitive to the initial color space representation of the image, that is, it works equally well on RGB, CMY, CMYG, or other color spaces used to define images.

DETAILED DESCRIPTION OF THE INVENTION

Figure 1:
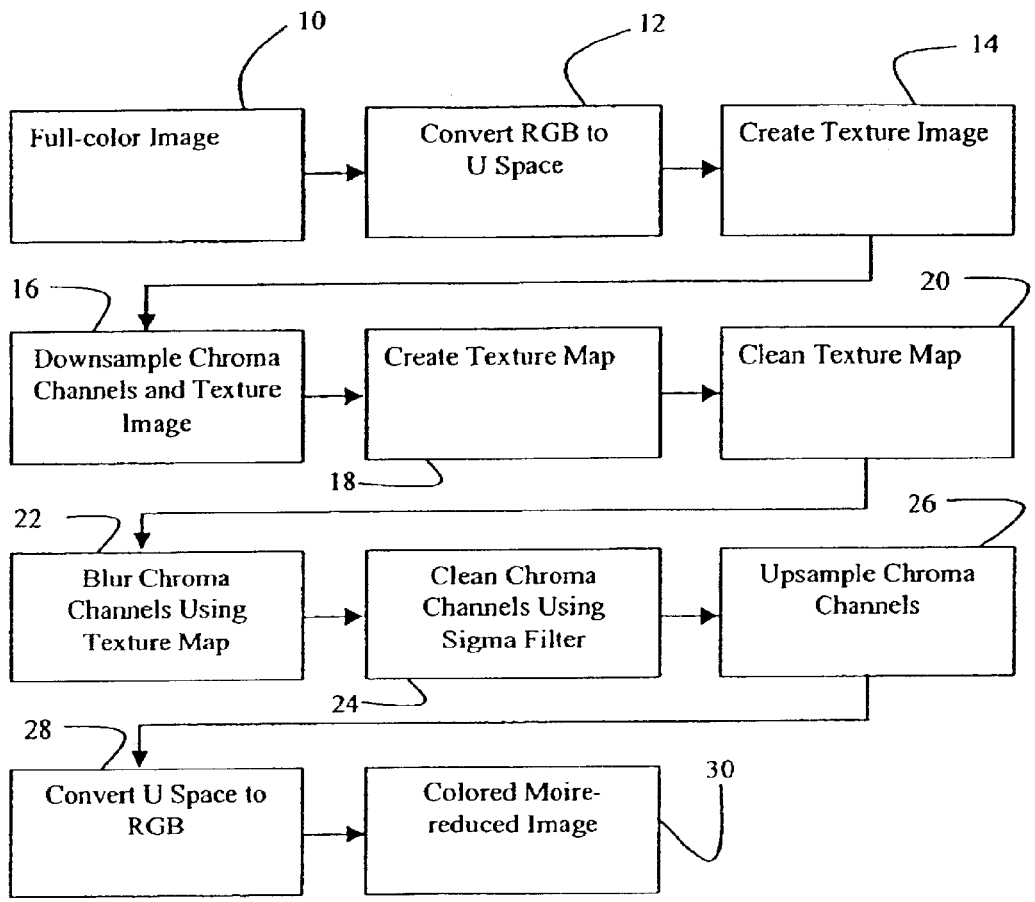
FIG. 1 is a block diagram of the overall invention.

FIG. 1 is a block diagram describing the invention. The method begins with a full-color image (block 10). It is assumed this image is in a standard red, green, blue (RGB) color representation. The image converted from RGB space into U space (block 12). U space as used herein is defined by Eqs. 1–2. Equation 1 transforms RGB data into U space data and Eq. 2 transforms U space data into RGB data. In Eqs. 1 and 2, Y stands for luma or luminance, $C_1$ stands for the first chroma or chrominance channel, and $C_2$ stands for the second chroma or chrominance channel.

$$\begin{pmatrix} Y \\ C_1 \\ C_2 \end{pmatrix} = \begin{pmatrix} 0 & 1 & 0 \\ -\frac{1}{4} & \frac{1}{2} & -\frac{1}{4} \\ -\frac{1}{2} & 0 & \frac{1}{2} \end{pmatrix} \begin{pmatrix} R \\ G \\ B \end{pmatrix} \quad (1)$$

$$\begin{pmatrix} R \\ G \\ B \end{pmatrix} = \begin{pmatrix} 1 & -2 & -1 \\ 1 & 0 & 0 \\ 1 & -2 & 1 \end{pmatrix} \begin{pmatrix} Y \\ C_1 \\ C_2 \end{pmatrix} \quad (2)$$

Figure 2:
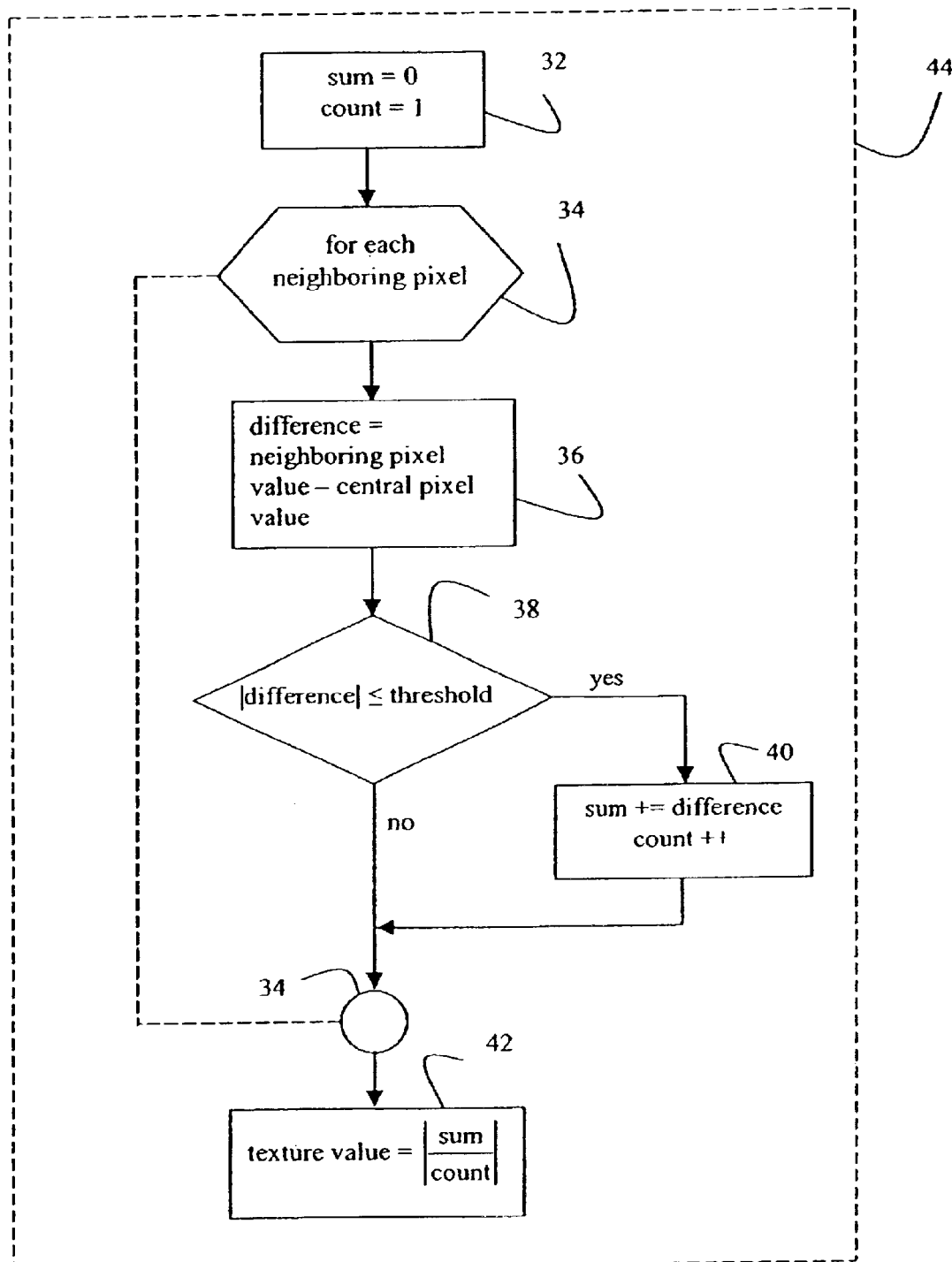
FIG. 2 is a flow chart describing the production of an individual channel of the intermediate texture image.

The first operation upon the U space image is to produce a texture image (block 14). The texture image is defined as an image that has "random" or pseudo-random high frequency elements. A modification of the standard sigma filter method is used to produce the texture image. See FIG. 2. For each (central) pixel in an image (block 44), a summing and a counting register is initialized (block 32). Each neighboring pixel (block 34) is examined one by one by forming a difference between the neighboring pixel value and the central pixel value (block 36). If the absolute value of this difference is less than or equal to a given threshold in the comparison block 38, then the signed difference value is added to the accumulated sum and the corresponding counter bumped (block 40). (Note that the contribution of the central pixel value will always be zero in this scheme. However, the neighborhood count needs to include the central pixel. Accordingly, the count is initialized to one instead of zero.)

Once the neighborhood of pixels has been processed, the texture value for the central pixel becomes the absolute value of the sum divided by the count (block 42). Each color channel (Y, $C_1$, and $C_2$) is separately processed to produce the corresponding channel of the texture image. The texture image filter uses a 3×3 square support region and a fixed threshold. For 8-bit sRGB images, a threshold of 40 for all three channels was found to work well.

Figure 3:
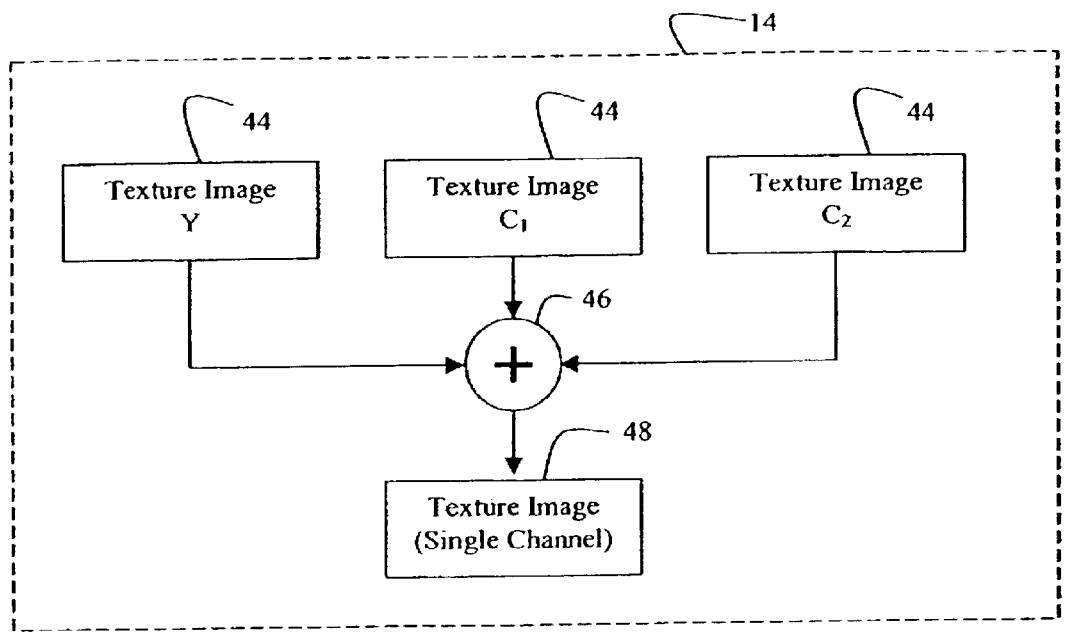
FIG. 3 is a flow chart describing the production of the final single-channel texture image.

Turning to FIG. 3, the three color channels of the texture image (block 44) are then summed in block 46 to produce a single channel texture image (block 48).

Returning to FIG. 1, the next operation is to downsample the chroma channels of the image and the texture image (block 16). The term "downsampling" refers to resampling on a sparser grid than is currently being used so as to produce fewer pixels. The downsampling is by a factor of three. Prior to the actual subsampling, the image planes are blurred (convolved with an antialiasing filter) with the standard 3×3 kernel given in Eq. 3, $$\frac{1}{k^2}\begin{pmatrix} 1 & 2 & 1 \\ 2 & 4 & 2 \\ 1 & 2 & 1 \end{pmatrix} = \frac{1}{k}(1 \ 2 \ 1) * \frac{1}{k}\begin{pmatrix} 1 \\ 2 \\ 1 \end{pmatrix} \quad (3)$$

where k=4 for the chroma channels and k=1 for the texture image. The preferred implementation is a two-pass calculation using the one-dimensional kernels in a standard way. Since the data will then be subsampled by every third pixel, only every third pixel needs to be blurred. (This is true for both rows and columns.)

Once the texture image has been downsampled (i.e., blurred in-place every three pixels), a texture map is produced by thresholding the texture image (block 18). For 8-bit sRGB images, a threshold value of 60 was found to work well. Thus, for every texture image value greater than or equal to 60, the texture map value is set to one. Otherwise, the texture map value is set to zero. The result is a binary texture map. The locations where the map is set to one represents potential regions of texture. Locations that are set to zero represent, potentially, nontextured regions.

Figure 4:
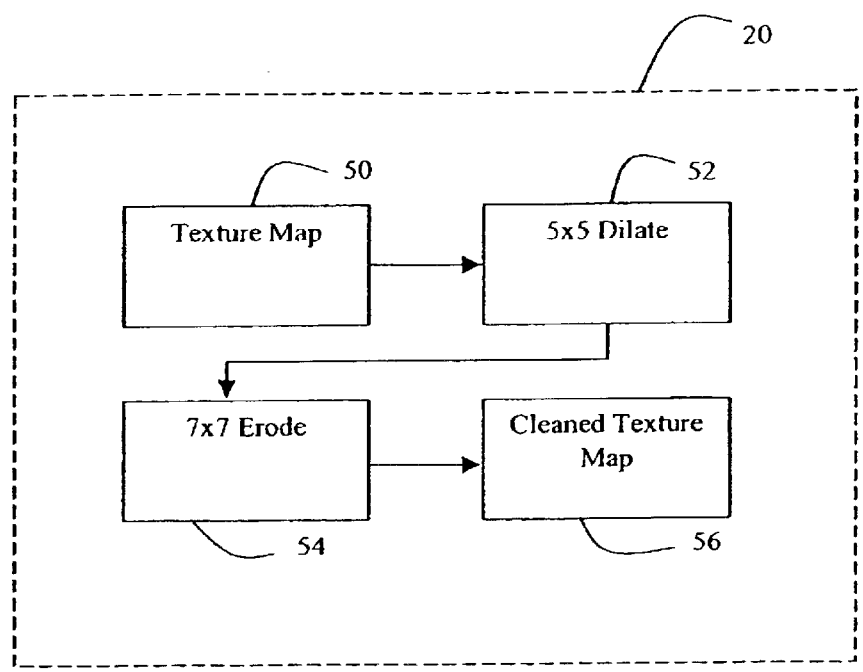
FIG. 4 is a block diagram of the texture map cleaning process.

Visual inspection of the texture map shows that in addition to regions of texture in the image, smaller, isolated clusters of false texture detection are also present. (These would be described in basic statistics as type I errors.) Additionally, there are small gaps (zeros) in the textured regions. (These would be statistical type II errors.) In order to eliminate the vast majority of these errors, a simple set of morphological operations are performed (block 20). See FIG. 4.

First, a 5×5 dilate operation (block 52) is performed on the texture map (block 50). (This can be thought of as equivalent to a sparse 13×13 operation at the original pixel data resolution.) As the texture map is binary, all that is required at each pixel location is to sum all of the map values in the support region and if the sum is greater than zero, then set the central map value to one. After the dilation, a 7×7 erode operation (block 54) is performed, again on the results of (block 52). (This would be equivalent to operating on a sparse 19×19 support region at the original pixel data resolution.) Because the texture map is binary, the only requirement is to sum all of the map values within a given support region. If the sum is less than 49(=$7^2$), set the central pixel to zero. The result is a cleaned texture map (block 56).

Figure 5:
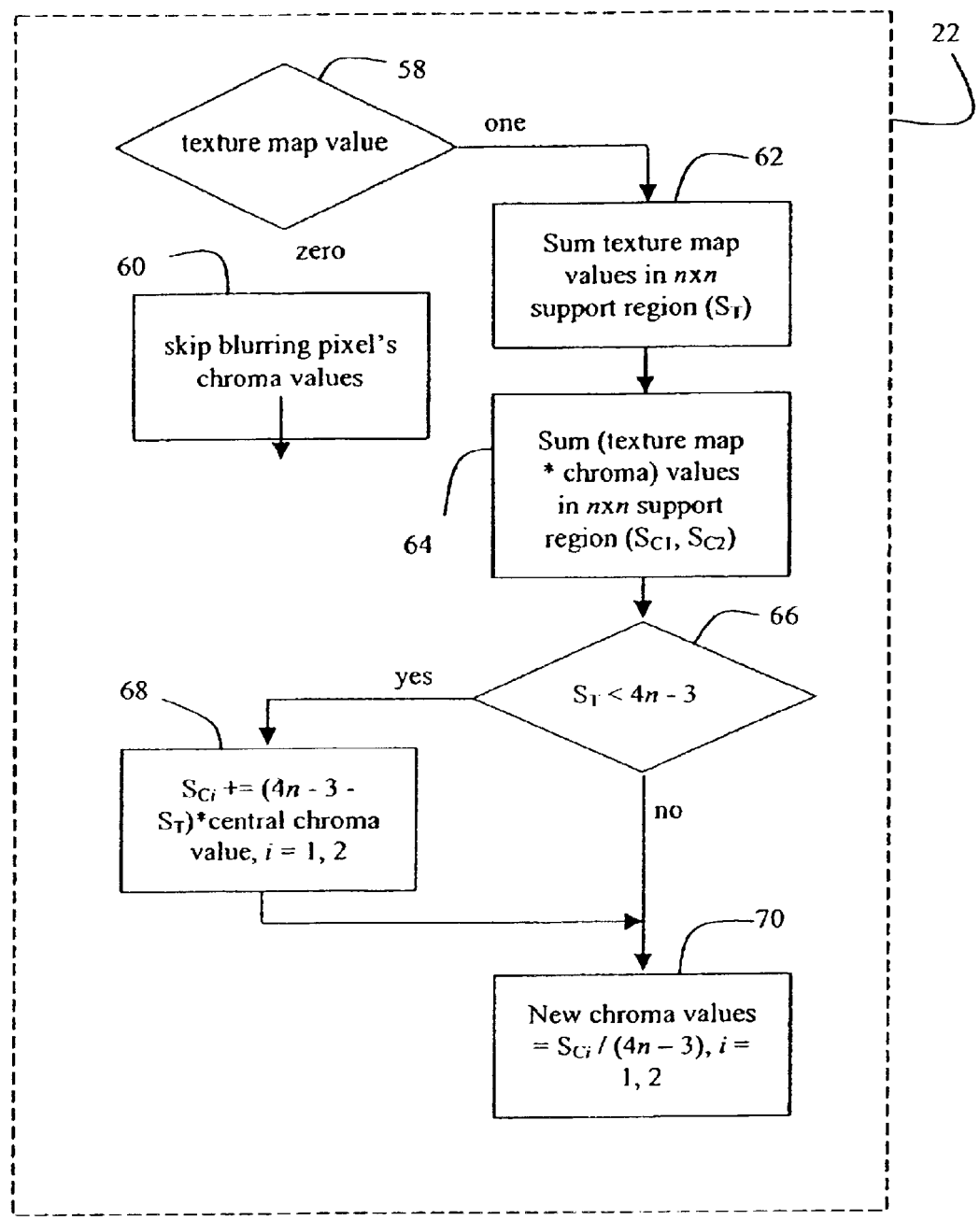
FIG. 5 is a flow chart describing the chrominance value cleaning of the textured portions of the image.

The image pixel data is ready to be cleaned. This is first done by blurring the subsampled chroma data as modified by the texture map (block 22, FIG. 1). See FIG. 5. If a pixel's texture map value is zero (block 58), then the pixel's chroma values are left unaltered (block 60). For those pixels with the texture map values of one, the first step is to sum the values of the texture map within the support region (block 62). In block 62 the support region is left as a general n×n region. From an image processing artifact standpoint, n can be set to any odd value from 3 on up. The larger the value of n, the more noise cleaning occurs. Because of the use of the texture map, there are no image processing artifact penalties for using larger support regions. Of course, there are execution time penalties for using larger support regions. In the preferred embodiment of the invention, values of n of 3, 5, and 7 were successfully tested without incurring significant execution time penalties. Once a value of n=7 had been used, there were hardly any remaining colored moiré patterns left to remove. n=7 corresponds to a sparse support region of 19×19 at the original pixel data resolution. It is not necessary to use every pixel within the support region perimeter. A (nonadaptive) spider-shaped support region will realize nearly all of the noise cleaning potential while requiring fewer computations.

Figure 6:
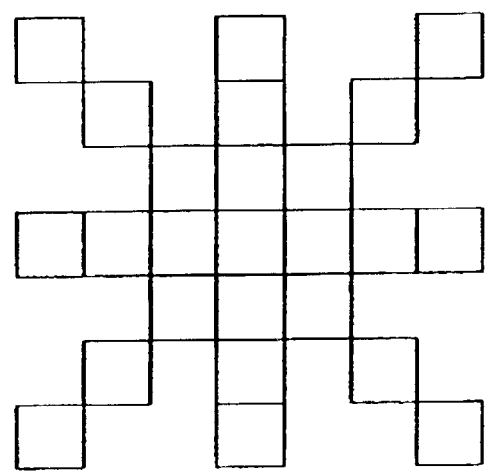
FIG. 6 is a diagram of a 7×7 spider-shaped pixel neighborhood.

FIG. 6 is a spider-shaped support region with n=7. n can be reduced to 5 or 3, with a corresponding reduction in noise cleaning capability. Having deciding on a value of n, then the corresponding number of pixels within the spider-shaped neighborhood will be 4n−3. Returning to FIG. 5, if the sum of the texture map values within the support region ($S_T$) equals 4n−3 (block 66), then for each chroma channel, average the corresponding 4n−3 chroma values to produce the cleaned chroma value (block 70). If $S_T$ is less than 4n−3, then the chroma averaging operation has one additional step. First, sum all of the chroma values that have a corresponding texture map value of one (block 68). Within block 68 this sum is added to the product of the central chroma value and the quantity (4n−3−$S_T$). This will result in a final sum of 4n−3 chroma values. Now, divide this sum by 4n−3 to produce the cleaned chroma value (block 70). This additional processing step reduces image processing artifacts at textured region boundaries.

The noise cleaning just performed will only affect pixels in the textured regions. To also clean the non-textured regions of the image, a simple sigma filtering of the chroma channels can be performed in sigma filter block 24 (see FIG. 1). Sigma filtering the chroma channels using a simple 3×3 support region (9×9 at the original pixel resolution) will provide adequate noise reduction with very few execution time or pixel artifact penalties.

Figure 7:
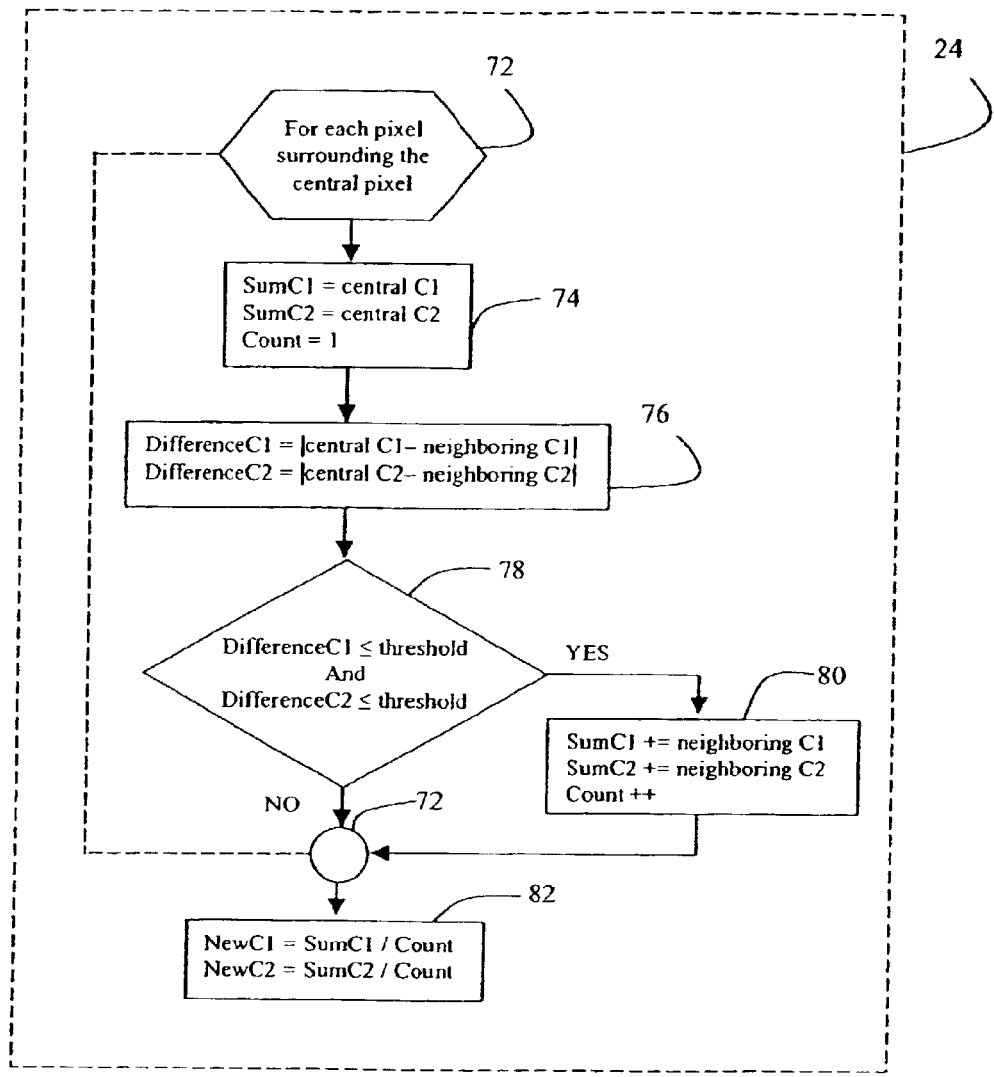
FIG. 7 is a flow chart describing the chrominance value cleaning of the nontextured portions of the image.

FIG. 7 is a flow chart of this chroma cleaning stage. For each pixel surrounding the central pixel (block 72), two summing registers and a count register are first initialized in register initialization block 74. The absolute difference in chrominance between each neighboring pixel and the central pixel is computed in difference block 76. Both chroma channel values must be within a threshold value in order for the pixel to be included in the cleaning calculations in comparison block 78. If this condition is met, then the summing and counting registers are updated appropriately in register update block 80. For noisy images, a threshold value of 10 is sufficient. It should now be clear that the color pixels in the chrominance signals are selected and modified so that the averaged colored pixels have corresponding chrominance values to the chrominance values of the pixel to be noise-cleaned.

Upsample block 26 upsamples the cleaned chroma values by a factor of three to return to the original pixel resolution (see FIG. 1). The term "upsampling" refers to resampling on a finer grid than is currently being used so as to produce more pixels. This is done using simple bilinear interpolation. Just as in the case of the blurring operation prior to downsampling, the bilinear interpolation may be done as a two-pass operation of one-dimensional linear interpolations. The interpolating kernels are given in Eq 4.

$$\frac{1}{9}\begin{pmatrix} 4 & 0 & 0 & 2 \\ 0 & [0] & 0 & 0 \\ 0 & 0 & 0 & 0 \\ 2 & 0 & 0 & 1 \end{pmatrix} = \frac{1}{3}(2\ [0]\ 0\ 1) * \frac{1}{3}\begin{pmatrix} 2 \\ [0] \\ 0 \\ 1 \end{pmatrix} \quad (4)$$

The pixel location being interpolated is marked with the brackets. The interpolation kernels are reflected about the horizontal or vertical axis in the standard manner as needed.

In FIG. 1, the final step is to convert the image from U space back to RGB space (block 28) using Eq. 2. The result is an image with reduced color aliasing artifacts (block 30).

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 10 full-color image
12 RGB to U space block
14 produce texture image block
16 downsample block
18 produce texture map block
20 clean texture map block
22 blur block
24 sigma-filter block
26 upsample block
28 U to RGB space block
30 color aliasing reduced image
32 register initialization block
34 neighborhood pixel selection block
36 difference block
38 comparison block
40 register update block
42 texture value computation block
44 texture image channel computation block
46 summing operation
48 texture image
50 texture map
52 dilate block
54 erode block
56 cleaned texture map
58 comparison block
60 null operation block
62 summing block
64 summing block
66 comparison block
68 register update block
70 cleaned pixel value computation block
72 neighborhood pixel selection block
74 register initialization block
76 difference block
78 comparison block
80 register update block
82 cleaned pixel value computation block

What is claimed is:

1. A method of reducing color aliasing artifacts from a color digital image having color pixels comprising the steps of:

(a) providing luminance and chrominance signals from the color digital image;

(b) using such luminance and chrominance signals to separate the image into textured and nontextured regions having boundaries;

(c) downsampling the chrominance signals and texture region mapping;

(d) producing cleaned chrominance signals in the textured regions in response to the boundaries of the textured region and chrominance signals;

(e) producing cleaned chrominance signals in the nontextured regions in response to the chrominance signals;

(f) upsampling the noise-cleaned chrominance signals; and (g) using the luminance and upsampled noise-cleaned chrominance signals to provide a color digital image having reduced color aliasing artifacts.

2. The method of claim 1 wherein step (c) is provided a plurality of times to produce the reduced resolution color digital image.

3. The method of claim 1 wherein step (d) the color pixels in the chrominance signals are selected so that color pixels to be averaged do not extend beyond the boundaries of the textured region.

4. The method of claim 1 wherein step (e) the color pixels in the chrominance signals are selected so that the averaged colored pixels have corresponding chrominance values to the chrominance values of the pixel to be noise-cleaned.

5. The method of claim 1 wherein step (f) is provided a plurality of times to produce an original resolution color digital image.

6. In a method for image processing, a color digital image and which includes minimizing color aliasing artifacts from a processed color digital image comprising the steps of:

(a) image processing an input color digital image to produce a new color digital image that is modified with respect to the input color digital image;

(b) reducing the number of color pixels in the input color digital image or the new color digital image to provide at least one lower resolution color digital image;

(c) converting the lower resolution color digital image into a color space having luminance and chrominance content;

(d) reducing aliasing artifacts in the chrominance content of the lower resolution color digital image by averaging chrominance values in a neighborhood of a color pixel of interest, wherein the color pixels averaged adjacent the color pixel of interest are related to the degree of image texture within the neighborhood;

(e) interpolating the aliasing reduced chrominance signal to a higher resolution; and (f) using the original luminance signal and the interpolated chrominance signal to provide a color digital image which is either the input color digital image or the new color digital image so that the processed digital image has reduced color aliasing artifacts.

7. A computer program product which practices the method of claim 1.

* * * * *